United States Patent Office 3,634,431
Patented Jan. 11, 1972

3,634,431
ACYLATED AND ALKYLATED DERIVATIVES OF 2-AMINOHEXAHYDROBENZO[a]QUINOLIZINES
John William Van Dyke, Jr., Elkhart, Ind., assignor to Miles Laboratories, Inc., Elkhart, Ind.
No Drawing. Continuation-in-part of application Ser. No. 858,850, Sept. 17, 1969, which is a division of application Ser. No. 650,579, July 3, 1967. This application Dec. 22, 1969, Ser. No. 887,344
Int. Cl. C07d 35/38
U.S. Cl. 260—287 R                    18 Claims

ABSTRACT OF THE DISCLOSURE

Acylated and alkylated derivatives of 2-aminohexahydrobenzo[a]quinolizine and pharmacologically acceptable salts thereof that are useful as antihypertensive agents. Prepared by reacting 2-oxo-1,3,4,6,7,11b-hexahydro-2H-benzo[a]quinolizine with an amine to form a Schiff base which is then reduced. The amine is acylated or alkylated with a halide or an anhydride.

This application is a continuation-in-part of my copending application Ser. No. 858,850 filed Sept. 17, 1969 which is a division of my copending application Ser. No. 650,579 filed July 3, 1967 both now abandoned.

This invention relates to new and useful compositions of matter and more particularly to acylated and alkylated derivatives of 2-aminohexahydrobenzo[a]quinolizine and a novel process for the preparation of such compounds.

Compounds of the invention may be represented by the structural formula:

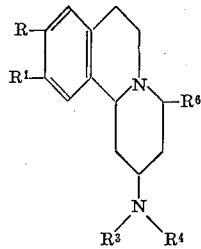

wherein R is a member selected from the group consisting of H, OH and lower alkoxy, $R^1$ is a member selected from the group consisting of H, OH and lower alkoxy, $R^3$ is a member selected from the group consisting of H, (lower) alkyl, cycloalkyl of between 3 and 7 carbon atoms, phenyl, substituted phenyl, diphenyl, phenyl(lower)alkyl and substituted phenyl(lower)alkyl in which the substituents are members selected from the group consisting of halogen, (lower)alkyl, lower alkoxy, cyano, lower alkoxy carbonyl and nitro, $R^4$ is a member selected from the group consisting of

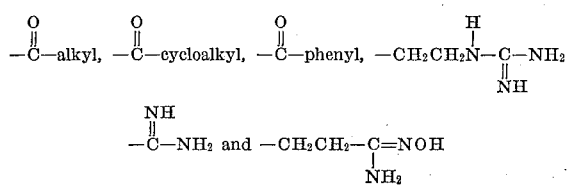

and $R^6$ is a member selected from the group consisting of H, (lower)alkyl and phenyl, and pharmacologically acceptable salts thereof. Preferably the (lower)alkyl groups in compounds of this invention will have between 1 and 4 carbon atoms.

The compounds of this invention may be prepared according to the following reaction sequence:

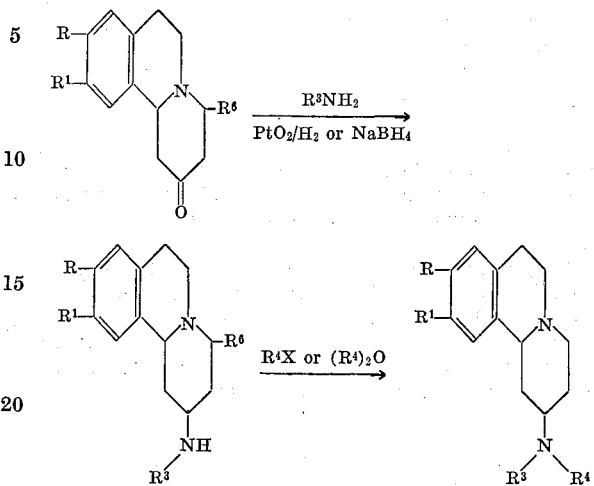

in which the values for R, $R^1$, $R^3$, $R^4$ and $R^6$ correspond respectively with their previous descriptions and X is a halogen.

In the reaction sequence, 2-oxo-1,3,4,6,7,11b-hexahydro-2H-benzo[a]quinolizine is reacted with an amine in a suitable solvent to form a Schiff base. The solvent utilized is not critical and may be dry toluene, benzene, xylene, etc. The reaction mixture is advantageously maintained under reflux in the presence of a catalyst. The reaction time is not critical and advantageously is dependent upon the required amount of water being collected and may be between about one and twelve or more hours. The catalyst may be an acid catalyst and is preferably an organic acid catalyst such as p-toluenesulfonic acid.

The Schiff base that is formed is then reduced, forming an amine. Advantageously, this reduction is carried out in a suitable solvent such as methanol, ethanol, or 2-propanol. To form the trans isomers, the reduction is beneficially carried out using $NaBH_4$. Preferably, for catalytic hydrogenation $PtO_2$ is used as a catalyst.

The amine is then subjected to an acylation or alkylation with a halide or anhydride having the desired $R^4$ radical. Although the operating conditions are not critical, this step is preferably performed under reflux for between about one and six hours. The resulting compound may then be purified according to known practices.

2-oxo-1,3,4,6,7,11b-hexahydro-2H-benzo[a]quinolizine, the starting material in the above reaction sequence may be prepared by the following reaction sequence:

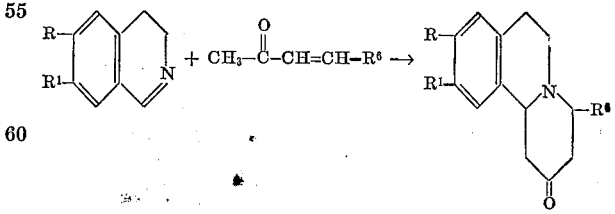

This synthesis is further described by Dénes Beke and Csaba Szántay in Chem. Ber., 95, 2132-2136, (1962).

Compounds of the invention may be prepared and utilized in the form of the free base. Preferably, however, the compounds are used as pharmacologically acceptable non-toxic, water-soluble addition salts of inorganic or organic acids such as halogen acids, sulfuric acid, maleic acid and the like.

The novel compounds, either in the form of the free bases or acceptable addition salts, are useful as antihypertensive agents.

Medications prepared with these compounds as active ingredients are readily formulated by mixing the compounds in dosage units with fillers, carriers, extenders and/or excipients generally used in preparing pharmaceutical formulations. When mixed in such a formulation, the compound may be in the form of a free base and is preferably in the form of a pharmacologically acceptable addition salt. The medication may be either in solid or liquid form and may be compounded as tablets, powders, capsules, suspensions and similar dosage forms according to accepted manufacturing methods. These medications may be administered, for example, orally or subcutaneously, in conformity with recognized pharmacological techniques.

The invention will be further understood by referring to the following examples which illustrate the preparation of compounds according to the invention. These examples will make clear to those skilled in the art how to facilely prepare other compounds within the scope of this invention as set forth in the appended claims.

EXAMPLE 1

N-[2-(1,3,4,6,7,11b-hexahydro-2H-benzo[a]quinolizinyl)]propionanilide.

Cis and trans isomers.—A mixture of 2-oxo-1,3,4,6,7,11b - hexahydro - 2H - benzo[a]quinolizine (5.6 g., 0.027 mole), aniline (2.5 g., 0.027 mole) and 50 ml. of dry toluene was refluxed for 12 hours using a Dean-Stark trap with p-toluenesulfonic acid as a catalyst. The solvent was removed in vacuo and the residue extracted with n-hexane. The n-hexane solution was then concentrated in vacuo and the residue recrystallized from ether. A light tan product crystallized out (Schiff Base). Yield, 2.14 g., M.P. 129–131° C. A solution of the product, 2-phenylimino-1,3,4,6,7,11b-hexahydro - 2H - benzo[a]quinolizine (2.14 g., 0.007 mole) in dry ethanol was hydrogenated using $PtO_2$ as a catalyst. After the reaction was complete, about one hour, the catalyst was removed by filtration and the filtrate concentrated in vacuo to yield 2.2 g. of 2-anilino-1,3,4,6,7,11b-hexahydro - 2H - benzo[a]quinolizine. This procedure was repeated with sufficient quantities of reactants to provide 20.6 g. of product. A solution of the anilino compound (20.6 g.) in 100 ml. of propionic anhydride was refluxed for about one hour. The excess propionic anhydride was removed in vacuo. The residue was dissolved in $H_2O$ and made basic with $K_2CO_3$. The organic material was extracted out with $CHCl_3$. The $CHCl_3$ was dried, filtered and concentrated in vacuo. The residue was taken up in hot ether, filtered and cooled. White chunky crystals were obtained and collected by filtration. Yield, 10.05 g., M.P. 125–26° C.

Analysis.—Calcd. for $C_{22}H_{26}N_2O$ (percent): N (basic), 4.19; C, 79.01; H, 7.84. Found (percent): N (basic), 4.21; C, 79.12; H, 7.90.

EXAMPLE 2

Trans isomer.—The process of this example was the same as Example 1 except as follows:

Larger quantities of reactants were utilized, i.e. 2-oxo-1,3,4,6,7,11b-hexahydro - 2H - benzo[a]quinolizine (69.5 g., 0.368 mole), aniline (34.2 g., 0.368 mole), and 200 ml. propionic anhydride, and the acylation reflux time was increased to six hours.

Following the acylation, the reaction mixture was evaporated to dryness on a steam bath in vacuo. Water was added to the semi-solid residue and warmed on a steam bath. The insoluble portion was removed by filtration. The filtrate was put aside. The insoluble portion was dissolved in dilute HCl and precipitated with $K_2CO_3$. The precipitate was dissolved in $CHCl_3$, dried over $MgSO_4$ and the solvent stripped in vacuo. The residue was slurried with ether, filtered and washed wtih cold ether. A solid, 29 g., was obtained. The solid was recrystallized twice from benzene-n-hexane. Yield, 20 g., M.P. 125–126° C. The product (15 g.) was chromatographed on an alumina column (350 g.). The column was eluted with benzene and benzene-ether (4:1) to obtain 7.5 g. of the trans isomer. The trans isomer was recrystallized from ether. Yield, 7 g., M.P. 125–126° C.

Analysis.—Calc'd. for $C_{22}H_{26}N_2O$ (percent): C, 79.01; H, 7.84; N, 8.38. Found (percent): C, 78.91; H, 7.96; N, 8.44;

I.R. $\nu_{max.}^{CHCl_3}$ 1645, 2755 and 2815 cm.$^{-1}$

EXAMPLE 3

Cis isomer.—The filtrate that was prepared according to the process of Example 2 and put aside was further processed to separate the cis isomer. The filtrate was made basic with $K_2CO_3$. The semi-solid precipitate that formed soon solidified and was collected by filtration and washed with water. The precipitate was dissolved in $CHCl_3$, dried over $MgSO_4$ and the solvent stripped in vacuo. The residue was slurried with ether, filtered and washed with cold ether. A solid, 14 g., was obtained. The solid was recrystallized from benzene-n-hexane. Yield, 8.5 g., M.P. 158–159° C.

Analysis.—Calcd. for $C_{22}H_{26}N_2O$ (percent): C, 79.01; H, 7.84; N (basic), 4.19; N (total), 8.38. Found (percent): C, 79.35; H, 7.98; N (basic), 4.20; N (total), 8.38.

I.R. $\nu_{max.}^{CHCl_3}$ 1645 cm,$^{-1}$ (no bands at 2755 or 2815 cm.$^{-1}$)

EXAMPLE 4

N - phenyl - N - (1,3,4,6,7,11b - hexahydro-2H-benzo[a]quinolizine-2-yl)butyramide monohydrochloride monomethanolate A Schiff base (73 g.), prepared as in Example 1 was placed in a 3-necked flask equipped with a reflux condenser and stirrer. Methanol (1500 ml.) was added and stirred during the addition of $NaBH_4$ (19.7 g.). The solution was refluxed for 1 hour and cooled. Water (1500 ml.) was added to the solution and the methanol removed in vacuo. The aqueous solution was extracted with ether and dried over $MgSO_4$. The ether was removed in vacuo and the residue recrystallized from absolute ethanol to yield 2 - anilino - 1,3,4,6,7,11b-hexahydro-2H-benzo[a]quinolizine. A solution of 2-anilino-1,3,4,6,7,11b-hexahydro-2H-benzo[a]quinolizine (13.9 g.; 0.05 M) and butyric anhydride (15.8 g.; 0.1 M) in 100 ml. of benzene was refluxed for 12 hours. The solvent was removed in vacuo and the resulting yellow oil stirred with hot $H_2O$ as concentrated HCl was added to effect dissolution. The hot solution was rendered alkaline with 20% NaOH. The mixture was extracted with $CHCl_3$. The combined $CHCl_3$ extracts were dried over $MgSO_4$ and filtered. The solvent was removed in vacuo and the resulting oil was crystallized and recrystallized from a mixture of benzene and n-heptane. The solid was dissolved in a mixture of 2-propanol, MeOH, and $CHCl_3$. To the resulting solution was added 15 ml. of 2.7 N HCl in 2-propanol. The solution was concentrated by boiling and EtOAc added. Upon cooling a white solid formed which was recrystallized from a mixture of MeOH and EtOAc. Yield 14.8 g., M.P. 163–168° C.

Analysis.—Calcd. for $C_{24}H_{33}N_2O_2Cl$ (percent): N, 6.72; C, 69.13; H, 7.98. Found (percent): N, 6.61; C, 68.89; H, 8.01.

EXAMPLE 5

N - phenyl - N - (1,3,4,6,7,11b - hexahydro-2H-benzo[a]quinolizine-2-yl)acetamide hydrochloride A solution of 2-anilino-1,3,4,6,7,11b-hexahydro-2H-benzo[a]quinolizine (13.9 g.; 0.05 M) and acetic anhydride (10.2 g.; 0.1 M) in 100 ml. of benzene was refluxed for 12 hours. The solvent was removed in vacuo and the resulting dark oil stirred in hot $H_2O$ as concentrated HCl was added to effect dissolution. The hot solution was rendered alkaline with 20% NaOH and cooled. The mixture was extracted with $Et_2O$ and the combined $Et_2O$ extracts were dried over $MgSO_4$ and filtered. The solvent was removed in vacuo from the filtrate. The resulting oil was crystallized and recrystallized from a mixture of benzene and n-heptane. Yield 10.4 g., M.P. 125–127° C. The solid was dissolved in a mixture of 2-propanol and MeOH. To the resulting solution was added 12 ml. of 2.7 N HCl in 2-propanol. The solution was concentrated by boiling and EtOAc was added until crystals began to form. Upon cooling a white crystalline solid formed and was removed by filtration. Yield 10.3 g., M.P. 253–259° C.

*Analysis.*—Calcd. for $C_{21}H_{25}N_2OCl$ (percent): N, 7.85; C, 70.67; H, 7.06. Found (percent): N, 7.95; C, 70.27; H, 7.04.

EXAMPLE 6

N - phenyl - N - (1,3,4,6,7,11b-hexahydro-9,10-dimethoxy- 2H - benzo[a]quinolizine - 2 - yl)propionamide hydrochloride A mixture of 9,10-dimethoxy-1,3,4,6,7,11b-hexahydro-2H-benzo[a]quinolizine-2-one (55 g.; 0.21 M), aniline (21.4 g.; 0.25 M), a catalytic amount of p-toluenesulfonic acid and 1,000 ml. of toluene was refluxed under a nitrogen atmosphere whereupon a clear solution resulted. The solution was refluxed for 24 hours utilizing a Dean-Stark trap to remove 4 ml. of $H_2O$. The solvent was removed in vacuo. The resulting dark red-orange oil was dissolved in 1,000 ml. of MeOH and cooled in an ice-bath. Solid $NaBH_4$ (20 g.) was added portionwise with stirring and the resulting solution was left to warm up to room temperature overnight. The solvent was removed in vacuo. The residue was dissolved in hot aqueous HCl and rendered alkaline with 20% NaOH. The resulting mixture was extracted with $Et_2O$. The combined $Et_2O$ extracts were dried over $MgSO_4$ and filtered. The solvent was removed in vacuo from the filtrate and the resulting dark syrup (70.1 g.) dissolved in 500 ml. of benzene. Propionic anhydride (27.3 g.; 0.21 M) was added and the resulting solution refluxed for 24 hours. The solvent was removed in vacuo. The oily residue was dissolved in 500 ml. of hot aqueous HCl and rendered alkaline, while hot, with $K_2CO_3$. The resulting mixture was cooled and extracted with $Et_2O$. The combined $Et_2O$ extracts were dried over $MgSO_4$ and filtered. The solvent was removed in vacuo from the filtrate to yield a semi-solid residue. The residue was dissolved in hot EtOAc and filtered twice through charcoal. The resulting clear filtrate (500 ml.) was warmed and 1,000 ml. of petroleum ether added. The solution was evaporated with gentle heating utilizing a stream of air until the volume was 500 ml., then 3,500 ml. of petroleum ether was added and the resulting solution allowed to cool slowly. A white solid formed which was removed by filtration. Yield 20.5 g., M.P. 173–174.5° C.

*Analysis.*—Calcd. for $C_{24}H_{30}N_2O_3$ (percent): N, 7.10; C, 73.07; H, 7.67. Found (percent): N, 6.86; C, 73.19; H, 7.84.

A sample of the above white solid (18.8 g.; 0.04765 M) was stirred in warm anhydrous $Et_2O$ (3,760 ml.) and 1,000 ml. of 2-propanol was added. To the resulting solution was added 184 ml. of 2.7 N HCl in 2-propanol. The resulting solution was allowed to cool to room temperature and anhydrous $Et_2O$ was added until the solution became cloudy. The total volume at this point was approximately 16,000 ml. The resulting mixture was allowed to set for 24 hours at room temperature and for an additional 24 hours in the refrigerator. The resulting white solid was removed by filtration and washed with anhydrous $Et_2O$. Yield 16.7 g., M.P. 247–249° C. dec.

*Analysis.*—Calcd. for $C_{24}H_{31}N_2O_3Cl$ (percent): N, 6.50; C, 66.88; H, 7.25. Found (percent): N, 6.58; C, 66.29; H, 7.19.

EXAMPLE 7

N - phenyl - N - (1,3,4,6,7,11b - hexahydro - 2H - benzo [a]quinolizine - 2 - yl) - cyclopropane carboxamide monohydrochloride monomethanolate Cyclopropane carboxylic acid chloride (8 ml.) was added dropwise to a stirred, refluxing solution of 2-anilino-1,3,4,6,7,11b-hexahydro - 2H - benzo[a]quinolizine (13.9 g.; 0.05 M), 100 ml. of dry THF and 25 ml. of dry pyridine. The resulting white mixture was refluxed for 12 hours and then poured over ice. The resulting mixture was rendered alkaline with 20% NaOH and diluted with $H_2O$ to 2 l. A white solid formed which was removed by filtration. The solid was dissolved in a hot mixture of MeOH (100 ml.) and $CHCl_3$ (150 ml.). The solution was cooled and 25 ml. of 2.7 N HCl in 2-propanol added. The resulting solution was boiled as MeOH was added. EtOAc was added to the concentrated MeOH solution and the resulting solution was left to cool. A white solid formed which was removed by filtration. Yield 19.6 g. melted slowly above 194° C.

*Analysis.*—Calcd. for $C_{24}H_{21}N_2O_2Cl$ (percent): N, 6.75; C, 69.46; H, 7.53. Found (percent): N, 6.69; C, 69.96; H, 7.32.

EXAMPLE 8

N - phenyl - N - (1,3,4,6,7,11b - hexahydro - 2H - benzo [a]quinolizine - 2 - yl)-benzoamide monohydrochloride monomethanolate.

Benzoyl chloride (7 ml.) was added dropwise to a stirred refluxing solution of 2-anilino-1,3,4,6,7,11b-hexahydro-2H-benzo[a]quinolizine (13.9 g., 0.05 M), 100 ml. of dry THF, and 25 ml. of dry pyridine. The resulting solution was refluxed for 12 hours. The reaction solution was poured over ice. A white solid formed. 20% NaOH was added to decompose any excess benzoyl chloride. The mixture was extracted with $Et_2O$. The combined $Et_2O$ extracts were dried over $MgSO_4$ and filtered. The solvent was removed in vacuo from the filtrate. The resulting oil was crystallized and recrystallized from a mixture of benzene and n-heptane to yield a white solid. The solid was dissolved in warm MeOH and 11 ml. of 2.7 N HCl in 2-propanol added. On heating the solution, a solid formed which was removed by filtration and recrystallized from a mixture of MeOH and EtOAc. Yield 10.3 g., slowly melted above 175° C.

*Analysis.*—Calcd. for $C_{27}H_{31}N_2O_2Cl$ (percent): N, 6.21; C, 71.91; H, 6.93. Found (percent): N, 6.25; C, 71.67; H, 6.85.

EXAMPLE 9

N - cyclohexyl - N - (1,3,4,6,7,11b - hexahydro - 2H-benzo[a]quinolizine - 2 - yl)propionamide hydrochloride (A) 1,3,4,6,7,11b - hexahydro - 2 - cyclohexylamino-2H-benzo[a]quinolizine.—A solution of 1,3,4,6,7,11b-hexahydro-2H-benzo[a]quinolizine - 2 - one (20.1 g.; 0.1 M), cyclohexylamine (9.9 g.; 0.1 M), and a catalytic amount of p-toluenesulfonic acid in 200 ml. of benzene was refluxed for three hours using a Dean-Stark trap to remove the theoretical amount of $H_2O$. The solution was cooled and the solvent removed in vacuo to yield a dark orange oil. The I.R. spectrum of the oil showed strong imine absorption at 1660 cm.$^{-1}$. The oil was dissolved in 200 ml. of MeOH. To this, stirred, ice-cold solution was added, portionwise, $NaBH_4$ (8.0 g.). After bubbling had ceased, the solution was refluxed for 1½ hours and cooled. The solvent was removed in vacuo and the residual oil shaken with a 50:50 mixture of $H_2O$ and $Et_2O$ (400 ml.). The resulting two phases were separated and the aqueous phase extracted with $Et_2O$. The combined ethereal extracts were dried over $MgSO_4$, then filtered. The filtrate was reduced in vacuo to an oil which crystallized upon cooling. An I.R. spectrum of the solid did not show any imine or ketone absorption. The oil was then distilled to give a yellow oil. Nitrogen analysis of the oil confirmed the free base. Upon standing, the yellow oil solidified to a waxy solid which darkened in color upon standing.

(B) N - cyclohexyl - N - (1,3,4,6,7,11b - hexahydro-2H - benzo[a]quinolizine - 2 - yl)propionamide hydrochloride.—1,3,4,6,7,11b-hexahydro - 2 - cyclohexylamino-2H-benzo[a]quinolizine (8.0 g.; 0.028 M), prepared as described in A, was dissolved in 200 ml. of benzene and propionic anhydride (3.6 g.; 0.028) was added. The resulting solution was refluxed for 3 hours and cooled to room temperature. The benzene solution was extracted with aqueous $Na_2CO_3$ solution, dried over $MgSO_4$ and filtered. The filtrate was filtered while hot through charcoal and diatomaceous earth and the solvent removed in vacuo to yield a dark orange oil. The I.R. spectrum showed strong amide adsorption at 1630 cm.$^{-3}$. The oil was dissolved in 100 ml. of 2-propanol and 14 ml. of 2.06 N HCl in 2-propanol was added with stirring. Anhydrous $Et_2O$ was added to the 2-propanol solution until no further precipitate was formed. The white precipitate was removed by filtration and recrystallized from methanol. Yield 3.3 g., M.P. 216–225° C. dec.

Analysis.—Calcd. for $C_{22}H_{33}N_2OCl$ (percent): N(Dumas) 7.43; C, 70.09; H, 8.82. Found (percent): N(Dumas) 7.22; C, 69.67; H, 8.99.

EXAMPLE 10

N - benzyl - N - (1,3,4,6,7,11b - hexahydro - 2H - benzo[a]quinolizine-2-yl)-propionamide hydrochloride (A) 2 - benzylamino - 1,3,4,6,7,11b - hexahydro-2H-benzo[a]quinolizine.—1,3,4,6,7,11b - hexahydro - 2H - benzo[a]quinolizine-2-one (40.25 g.; 0.2 M) was dissolved in 450 ml. dry benzene. Benzylamine (21.43 g.; 0.2 M) was added along with a catalytic amount of p-toluenesulfonic acid and the solution was refluxed for 3 hours using a Dean-Stark trap to remove 3.6 ml. $H_2O$. The solution was cooled and reduced in vacuo to a syrup. The I.R. spectrum showed the desired imine absorption at 1670 cm.$^{-1}$. The syrup was dissolved in 200 ml. of MeOH and cooled in ice bath. Solid $NaBH_4$ (16 g.) was added in small portions, with stirring, to the cold MeOH solution. After bubbling had ceased, the resulting solution was refluxed for one hour, cooled and reduced in vacuo to a volume of 200 ml. Water (33 ml.) was slowly added followed by the addition of 300 ml. $Et_2O$. The resulting two phase system was transferred to a separatory funnel and the aqueous layer extracted with $Et_2O$. The combined $Et_2O$ extracts were dried over $MgSO_4$ and filtered. The filtrate was reduced in vacuo to a syrup. The I.R. spectrum did not show an imine or ketone absorption.

(B) N - benzyl-N-(1,3,4,6,7,11b-hexahydro-2H-benzo[a]quinolizine - 2 - yl)propionamide hydrochloride.—Benzylamino-1,3,4,6,7,11b - hexahydro - 2H - benzo[a]quinolizine (10 g.), prepared as described in (A), was dissolved in 150 ml. of benzene. To the resulting solution was added propionic anhydride (4.5 g.; 0.035 M). An initial rise in temperature of 5° C. was noted. The solution was refluxed for 2 hours, cooled and extracted with aqueous $Na_2CO_3$ solution. The benzene layer was dried over $MgSO_4$ and filtered. The filtrate was reduced in vacuo to a syrup. The I.R. spectrum of the syrup showed strong amide absorption at 1630 cm.$^{-1}$. The hydrochloride salt was formed by dissolution of the syrup in $Et_2O$ followed by bubbling gaseous HCl through the solution. A white solid formed which was removed by filtration and recrystallization from anhydrous EtOH/EtOAc. Yield 5.7 g., M.P. 194–196° C.

Analysis.—Calcd. for $C_{23}H_{29}N_2OCl$ (percent): N(Dumas) 7.28; C, 71.76; H, 7.59. Found (percent): N(Dumas) 7.13; C, 71.44; H, 7.79.

EXAMPLE 11

N-phenethyl-N-[2-(1,3,4,6,7,11b-hexahydro-2H-benzo[a]quinolizine-2-yl)]propionamide hydrochloride (A) 1,3,4,6,7,11b-hexahydro - 2 - phenethylamino-2H-benzo[a]quinolizine.—1,3,4,6,7,11b-hexahydro-2H-benzo[a]quinolizine-2-one (40.25 g.; 0.2 mole) was dissolved in 450 ml. dry benzene. β-Phenethylamine (25.3 ml.; 24.24 g.; 0.2 mole) was added with a catalytic amount of p-toluenesulfonic acid and the solution refluxed for 1½ hours utilizing a Dean-Stark trap to remove 3.6 ml. $H_2O$. The solution was cooled and reduced to a syrup in vacuo. The I.R. spectrum of the syrup showed the desired imine absorption at 1670 cm.$^{-1}$. The syrup was then dissolved in 300 ml. of MeOH and cooled in an ice bath. A solution of $NaBH_4$ (16 g.) in 15 ml. of MeOH was then slowly added, with stirring, to the cooled solution of the syrup in MeOH. After bubbling had ceased, the solution was refluxed for 45 minutes, cooled and reduced in vacuo to a volume of 100 ml. Water (200 ml.) was slowly added followed by the addition of 200 ml. $Et_2O$. The two phase system was then transferred to a separatory funnel and the aqueous layer extracted with $Et_2O$. The combined $Et_2O$ extracts were dried over $MgSO_4$, then filtered. The filtrate was reduced in vacuo to a syrup. The I.R. spectrum of the syrup did not show any imine or ketone absorption.

(B) N-phenethyl - N - [2-(1,3,4,6,7,11b-hexahydro-2H-benzo[a]quinolizine-2-yl)]propionamide hydrochloride.—1,3,4,6,7,11b-hexahydro - 2-phenethylamino-2H-benzo[a]quinolizine (10 g.; 0.032 mole), prepared as described in (A), was dissolved in 150 ml. benzene. To the resulting solution was added propionic anhydride (4.5 g.; 0.035 mole). An initial rise in temperature of 12° C. was noted. The solution was refluxed for 12 hours, cooled and extracted with aqueous $Na_2CO_3$ solution. The benzene layer was dried over $MgSO_4$ and filtered. The filtrate was reduced in vacuo to a syrup. The I.R. spectrum of the syrup showed strong amide absorption at 1640 cm.$^{-1}$. The hydrochloride salt of the desired product was obtained by utilization of the procedure described for salt formation in the above. Yield 9.7 g., M.P. 199–202° C.

Analysis.—Calcd. for $C_{24}H_{31}N_2ClO$ (percent): N(Dumas) 7.02; C, 72.25; H, 7.83. Found (percent): N(Dumas) 6.89; C, 71.50; H, 7.96.

EXAMPLE 12

N-(3-methylphenyl)-N-(1,3,4,6,7,11b-hexahydro-2H-benzo[a]quinolizine-2-yl)propionamide (A) 2-(m-methylanilino)-1,3,4,6,7,11b-hexahydro-2H-benzo[a]quinolizine.—A solution of 1,3,4,6,7,11b-hexahydro-2H-benzo[a]quinolizine-2-one (20.1 g.; 0.1 M), m-toluidine (10.7 g.; 0.1 M), and a catalytic amount of p-toluenesulfonic acid in 300 ml. of benzene was refluxed under a nitrogen atmosphere for 17 hours. A Dean-Stark trap was utilized to remove 1.8 ml. of $H_2O$. The solvent was removed from the reaction solution in vacuo to yield a dark orange oil. The I.R. spectrum exhibited strong imine absorption. The oil was dissolved in 250 ml. of MeOH and cooled in an ice bath. Solid $NaBH_4$ (8 g.) was added portionwise, with stirring, to the cold MeOH solution. After bubbling ceased, the solution was refluxed for 3 hours and cooled. The solvent was removed in vacuo and the resulting semi-solid residue was extracted with $CHCl_3$ vs. $H_2O$. The $CHCl_3$ extracts were dried over $MgSO_4$ then filtered. The filtrate was reduced in vacuo to an oil. The I.R. spectrum did not exhibit any imine or ketone absorptions. The oil was dissolved in hot aqueous EtOH and upon cooling a white crystalline product formed. The solid was removed by filtration, washed with cold aqueous EtOH, and dried overnight in vacuo at 78° C.

(B) N-(3-methylphenyl) - N - (1,3,4,6,7,11b-hexahydro-2H-benzo[a]quinolizine - 2 - yl)propionamide hydrochloride.—A solution of 1,3,4,6,7,11b-hexahydro-2-(m- methylanilino) - 2H - benzo [a]quinolizine (5.1 g.; 0.0174 M) and propionic anhydride (2.6 g.; 0.02 M) in 100 ml. of benzene was refluxed for 24 hours. The solvent was removed in vacuo and 100 ml. of $H_2O$ added to the resulting residue. The mixture was heated on a steam bath and concentrated HCl added to effect dissolution. The hot solution was rendered alkaline with $K_2CO_3$ and cooled. The mixture was extracted with $Et_2O$, the combined $Et_2O$ extracts dried over $MgSO_4$ and filtered. Removal of the solvent in vacuo from the filtrate yielded a yellow oil which crystallized upon setting. The yellow solid was recrystallized from n-heptane. Yield 4.0 g., M.P. 126–127° C.

*Analysis.*—Calcd. for $C_{23}H_{28}N_2O$ (percent): N, 8.04; C, 79.27; H, 8.10. Found (percent): N, 7.90; C, 79.87; H, 8.21.

The solid was dissolved in 2-propanol and 2.7 N HCl in 2-propanol (10 ml.) added. Anhydrous $Et_2O$ was added to the solution until it became cloudy. An oil formed which did not crystallize. The solvent was removed in vacuo to yield a light yellow oil. The oil was dissolved in EtOH and concentrated on a hot plate by boiling. EtOAc was added to the solution and a clear oil formed which crystallized after setting for one week. The white solid was removed by filtration. Yield 3.5 g., M.P. 192–198° C.

*Analysis.*—Calcd. for $C_{23}H_{29}N_2OCl$ (percent): N, 7.28; C, 71.75; H, 7.59. Found (percent): N, 7.21; C, 71.17; H, 7.67.

EXAMPLE 13

N-(1,3,4,6,7,11b-hexahydro-2H-benzo[a]quinolizine-2-yl)-2',4'-dimethoxypropionanilide hydrochloride (A) 2 - (2,4 - dimethoxyanilino) - 1,3,4,6,7,11b - hexahydro - 2H - benzo[a]quinolizine.—A solution of 1,3,4,6,7,11b - hexahydro - 2H - benzo[a]quinolizine - 2-one (40.2 g.; 0.2 M), 2,4-dimethoxyaniline (33.7 g.; 0.22 M), and a catalytic amount of p-toluenesulfonic acid in 500 ml. of benzene was refluxed for 20 hours in an atmosphere of nitrogen using a Dean-Stark trap to remove $H_2O$. The reaction solution was cooled and the solvent removed in vacuo to yield a dark syrup. The I.R. spectrum showed imine absorption at 1660 cm.$^{-1}$. The syrup was dissolved in 500 ml. of MeOH and cooled in an ice-bath. Solid $NaBH_4$ (16.0 g.) was added portionwise with stirring to the above cold solution. After bubbling had ceased, the mixture was refluxed for one hour and cooled. The solid which formed was removed by filtration, washed with cold MeOH, and air dried at room temperature. Yield 36.8 g., M.P. 116–118° C.

*Analysis.*—Calcd. for $C_{21}H_{26}N_2O_2$ (percent): N-(Dumas) 8.28; C, 74.53; H, 7.74. Found (percent): N(Dumas) 8.11; C, 74.21; H, 7.88.

(B) N - (1,3,4,6,7,11b - hexahydro - 2H - benzo[a] quinolizine - 2 - yl) - 2',4' - dimethoxypropionanilide hydrochloride.—A solution of 2 - (2,4 - dimethoxyanilino) - 1,3,4,6,7,11b - hexahydro - 2H - benzo[a]quinolizine (16.9 g., 0.05 M) and propionic anhydride (13.0 g.; 0.1 M) in 200 ml. of benzene was refluxed for 72 hours, cooled and extracted with an aqueous solution of $Na_2CO_3$. The benzene solution was then dried over $MgSO_4$ and filtered. The filtrate was reduced in vacuo to an oil. The I.R. spectrum showed strong anhydride absorptions in addition to the strong amide absorption at 1640 cm.$^{-1}$. The oil was dissolved in 500 ml. of anhydrous $Et_2O$ and gaseous HCl was bubbled through the cooled, stirred solution. A white solid formed which was removed by filtration and washed well with anhydrous $Et_2O$. The solid was recrystallized, first from 2-propanol, then from MeOH/$Et_2O$. Yield 16.6 g., M.P. 265–267° C.

*Analysis.*—Calcd. for $C_{24}H_{31}N_2O_3Cl$ (percent): N-(Dumas) 6.50; C, 66.88; H, 7.25. Found (percent): N(Dumas) 6.40; C, 66.68; H, 7.45.

EXAMPLE 14

N-(1,3,4,6,7,11b-hexahydro-2H-benzo[a]quinolizine-2-yl)-3',4',5'-trimethoxypropionanilide hydrochloride (A) 1,3,4,6,7,11b - hexahydro - 2 - (3,4,5 - trimethoxyanilino) - 2H - benzo[a]quinolizine.—A solution of 1,3,4,6,7,11b - hexahydro - 2H - benzo[a]quinolizine - 2-one (30.2 g.; 0.15 M), 3,4,5-trimethoxyaniline (27.5 g.; 0.15 M), and a catalytic amount of p-toluenesulfonic acid in 500 ml. of benzene was refluxed for 16 hours in an atmosphere of nitrogen using a Dean-Stark trap to remove $H_2O$. The solution was cooled and the solvent removed in vacuo to yield a dark reddish-orange syrup. The I.R. spectrum showed strong imine absorption at 1660 cm.$^{-1}$. The syrup was dissolved in 400 ml. of MeOH and the resulting solution cooled in an ice-bath. Solid $NaBH_4$ (12 g.) was added portionwise, with stirring, to the above cold solution. When bubbling had ceased the solution was refluxed for 4 hours and cooled to room temperature. The solvent was removed in vacuo and the residue was shaken with 600 ml. of a mixture of $H_2O$ and $Et_2O$ (50:50). The resulting two phases were separated and the aqueous phase extracted with $Et_2O$. The extracts were dried over $MgSO_4$ and filtered. The filtrate was reduced in vacuo to a dark syrup. The dark syrup was dissolved in 600 ml. of benzene and divided into two equal 300 ml. aliquots.

(B) N - (1,3,4,6,7,11b - hexahydro - 2H - benzo[a] quinolizine - 2 - yl) - 3',4',5' - trimethoxypropionanilide hydrochloride.—1,3,4,6,7,11b - hexahydro - 2 - (3,4,5-trimethoxyanilino) - 2H - benzo[a]quinolizine, the 300 ml. portion from (A), was added to propionic anhydride (19.5 g.; 0.15 M). The resulting solution was refluxed for 24 hours and cooled to room temperature. The solvent was removed in vacuo to yield a dark syrup. The syrup was dissolved in 100 ml. of anhydrous $Et_2O$ and 37.5 ml. of 2.06 N HCl in 2-propanol was added with stirring. Additional anhydrous $Et_2O$ was added until a product precipitated. The solid was separated by filtration and washed with anhydrous $Et_2O$. The solid was recrystallized three times from 2-propanol/$Et_2O$. Yield 8.1 g., M.P. 197.5–198° C.

*Analysis.*—Calcd. for $C_{25}H_{33}N_2O_4Cl$ (percent): N-(Dumas 6.08; C, 65.14; H, 7.22. Found (percent): N(Dumas) 5.89; C, 64.72; H, 7.36.

EXAMPLE 15

N-(4-cyanophenyl)-N-(1,3,4,6,7,11b-hexahydro-2H-benzo[a]quinolizine-2-yl)propionamide (A) 2(p - cyanoanilino) - 1,3,4,6,7,11b - hexahydro-2H - benzo[a]quinolizine.—A solution of 1,3,4,6,7,11b-hexahydro - 2H - benzo[a]quinolizine - 2 - one (20.1 g.; 0.1 M), p-aminobenzonitrile (11.8 g.; 0.1 M), and a catalytic amount of p-toluenesulfonic acid in 250 ml. of benzene was refluxed under a nitrogen atmosphere for 96 hours. A Dean-Stark trap was utilized to remove 1.2 ml. of $H_2O$ (theory=1.8 ml. $H_2O$). The volume was reduced to 75 ml. by distillation. The orange solid formed upon cooling was removed by filtration. The I.R. spectrum exhibited strong nitrile absorption at 2225 cm.$^{-1}$ and strong imine absorption at 1670 cm.$^{-1}$. There was no ketone absorption. The orange solid was suspended in 300 ml. of MeOH and cooled in an ice-bath. Solid $NaBH_4$ (20 g.) was added portionwise with stirring. When bubbling had ceased, the resulting solution was refluxed for 2 hours, cooled and the solvent removed in vacuo. The resulting semi-solid residue was extracted with $CHCl_3$ vs. $H_2O$. The $CHCl_3$ extracts were dried over $MgSO_4$ and filtered. The filtrate was reduced in vacuo and the I.R. spectrum of the resulting yellow oil did not exhibit any imine absorption but retained the desired nitrile absorption. A light yellow solid was obtained from the yellow oil by dissolution of the oil in hot aqueous EtOH and allowing the resulting solution to cool.

(B) N-(4-cyanophenyl) - N - (1,3,4,6,7,11b-hexahydro-2H - benzo[a]quinolizine-2-yl)propionamide hydrochloride.—A solution of 2-(p - cyanoanilino) - 1,3,4,6,7,11b-hexahydro-2H-benzo[a]quinolizine (5.3 g.; 0.0175 M) and propionic anhydride (2.6 g.; 0.02 M) in 100 ml. of benzene was refluxed for 24 hours. The solvent was removed in vacuo and the resulting residue stirred in 100 ml. of hot $H_2O$ to which 10 ml. of concentrated HCl was added to effect dissolution. The resulting solution was rendered basic with $K_2CO_3$. The mixture was extracted with $CHCl_3$ and the combined $CHCl_3$ extracts were dried over $MgSO_4$ and filtered. Removal of the solvent in vacuo from the filtrate yielded an oil which was shown by I.R. to be the starting amine. Propionic anhydride (50 ml.) was added to the oil and the resulting mixture was heated on a steam bath for 48 hours. The solution was cooled and 100 ml. of $H_2O$ added followed by an addition of 25 ml. of concentrated HCl. The solution was rendered alkaline with 20% NaOH and extracted with $CHCl_3$. The combined $CHCl_3$ extracts were dried over $MgSO_4$, filtered and the solvent removed from the filtrate in vacuo. The resulting solid residue was recrystallized from benzene and n-heptane. Yield 3.5 g., M.P. 105–185° C.

*Analysis.*—Calcd. for $C_{23}H_{25}N_3O$ (percent): N, 11.68; C, 76.85; H, 7.01. Found (percent): N, 11.77; C, 76.20; H, 7.00.

The solid was dissolved in hot 2-propanol and two successive 10 ml. portions of 2.7 N HCl in 2-propanol were added. The solution was concentrated by boiling on a hot plate and EtOAc was added until crystals began to form. Upon cooling, a white solid formed which was removed by filtration. Yield 1.4 g., M.P. 248–258° C. dec.

*Analysis.*—Calcd. for $C_{23}H_{26}N_3OCl$ (percent): N, 10.61; C, 69.78; H, 6.62. Found (percent): N, 10.10; C, 69.62; H, 6.73.

EXAMPLE 16

N-(4-biphenyl)-N-(1,3,4,6,7,11b-hexahydro-2H-benzo-[a]quinolizine-2-yl)propionamide hydrochloride (A) 2-(4 - biphenylamino) - 1,3,4,6,7,11b-hexahydro-2H-benzo[a]quinolizine.—A solution of 1,3,4,6,7,11b-hexahydro-2H-benzo[a]quinolizine-2-one (20.1 g.; 0.1 M), 4-aminobiphenyl (16.9 g.; 0.1 M), and a catalytic amount of p-toluenesulfonic acid in 250 ml. of benzene was refluxed under a nitrogen atmosphere for 18 hours. A Dean-Stark trap was utilized to remove 1.8 ml. of $H_2O$. The solvent was removed in vacuo and the I.R. spectrum of the resulting reddish-orange oil exhibited strong absorption for imine at 1670 cm.$^{-1}$. The oil was dissolved in 500 ml. of MeOH and the resulting solution cooled in an ice-bath. Solid $NaBH_4$ (8 g.) was added portionwise with stirring. When bubbling ceased, the solution was refluxed for 2 hours. A solid began to precipitate from the solution and approximately 350 ml. of solvent was removed by distillation. After cooling, the mixture was filtered to yield a light colored solid. The solid was recrystallized from 95% EtOH.

(B) N - (4 - biphenyl) - N - (1,3,4,6,7,11b-hexahydro-2H-benzo[a]quinolizine - 2 - yl)propionamide hydrochloride.—A solution of 2-(4-biphenylamino)-1,3,4,6,7,11b-hexahydro-2H-benzo[a]quinolizine (8.9 g.; 0.0251 M) and propionic anhydride (3.9 g.; 0.03 M) in 100 ml. of benzene was refluxed overnight. The solvent was removed in vacuo and the resulting residue stirred in 100 ml. of hot $H_2O$. Concentrated HCl (10 ml.) was added to effect dissolution and the resulting hot solution was rendered alkaline with $K_2CO_3$. An oil formed which immediately solidified in the hot solution. The resulting mixture was cooled, the solid removed by filtration and washed with $H_2O$ to yield a brown solid (11 g.) which slowly melted above 115° C. The I.R. spectrum was devoid of N-H absorption but exhibited both strong amide absorption at 1645 cm.$^{-1}$ and salt-like absorption around 2500 cm.$^{-1}$. The brown solid was dissolved in hot $CHCl_3$ and filtered through charcoal. The filtrate was boiled on a hot plate and successive portions of EtOAc added as the $CHCl_3$ was removed until a solid began to crystallize in the hot solution. The mixture was cooled and the resulting solid removed by filtration to yield 4.0 g., M.P. 265–275° C. dec. The solid was dissolved in boiling $H_2O$ to which 10 ml. of concentrated HCl had been added. The hot solution was filtered through charcoal to yield a colorless solution. Upon cooling, a white solid formed which was removed by filtration to yield 2.2 g. of a white solid which softened at 165° C. and melted with decomposition at 265–275° C.

The white solid was dissolved in MeOH and the resulting solution was boiled to remove $H_2O$ at an azeotrope. The solution was then concentrated further by boiling and EtOAc was added. Upon cooling a white solid formed which was removed by filtration. Yield 2.0 g., M.P. 274–279° C. dec.

*Analysis.*—Calcd. for $C_{28}H_{31}N_2OCl$ (percent): N, 6.27; C, 75.24; H, 6.99. Found (percent): N, 6.17; C, 75.74; H, 7.28.

EXAMPLE 17

N-(1,3,4,6,7,11b-hexahydro-2H-benzo[a]quinolizine-2-yl)propionamide hydrochloride (A) 1,3,4,6,7,11b - hexahydro - 2H - benzo[a]quinolizine-2-one oxime.—1,3,4,6,7,11b-hexahydro - 2H - benzo[a]quinolizine-2-one (20.1 g.; 0.1 M), hydroxylamine hydrochloride (20.1 g.; 0.289 M), 100 ml. of pyridine and 100 ml. of anhydrous EtOH was refluxed for 2½ hours. The solvent was removed in vacuo, the solid residue triturated with 100 ml. of cold $H_2O$ and filtered. The solid was dissolved in 1.5 l. of hot $H_2O$ then cooled in an ice-bath. The cold solution was rendered alkaline with $NaHCO_3$ and the resulting precipitate removed by filtration.

(B) 2 - amino - 1,3,4,6,7,11b-hexahydro-2H-benzo[a]quinolizine.—A solution of 1,3,4,6,7,11b-hexahydro-2H-benzo[a]quinolizine oxime (15.0 g.; 0.0693 M) in 275 ml. of dry THF was added dropwise, with stirring, to a suspension of $LiAlH_4$ (7.8 g.; 0.2079 M) in 300 ml. of dry THF. The resulting mixture was refluxed for 24 hours. The reduction complex and excess $LiAlH_4$ were decomposed by the successive dropwise addition of 7.8 ml. of $H_2O$ in 78 ml. of THF, 5.85 ml. of 20% NaOH, and 27.3 ml. of $H_2O$ to the ice-cold, stirred mixture. The mixture was stirred in the ice-bath for 2 hours, filtered and washed with THF. The filtrate was reduced in vacuo to an oil which was dissolved in $CHCl_3$, dried over $MgSO_4$ and filtered. The filtrate was reduced in vacuo to a yellow oil.

(C) N - (1,3,4,6,7,11b - hexahydro - 2H-benzo[a] quinolizine-2-yl)-propionamide hydrochloride.—A solution of 2 - amino - 1,3,4,6,7,11b-hexahydro-2H-benzo[a] quinolizine (7.0 g.; 0.0346 M) (the oil from (B) and propionic anhydride (4.5 g.; 0.0346 M) in 200 ml. of benzene was refluxed for 7½ hours. The solvent was removed in vacuo and the resulting oil was stirred with hot $H_2O$ as concentrated Hcl was added to effect dissolution. The solution was rendered alkaline with 20% NaOH. The mixture was extracted with $CHCl_3$. The combined $CHCl_3$ extracts were dried over $MgSO_4$ and filtered. The solvent was removed in vacuo from the filtrate and the residue was crystallized from a mixture of benzene and n-heptane. The solid was dissolved in 65 ml. of hot 2-propanol. After cooling the solution, 10 ml. of 2.7 N HCl in 2-propanol was added. The solution was concentrated by boiling and EtOAc was added. After the solution had been cooled to 5° C. a small amount of anhydrous $Et_2O$ was added and the solution was left at 5° C. for 4 days. A solid formed which was removed by filtration. Yield 3.5 g. which slowly decomposes at 200–230° C.

*Analysis.*—Calcd. for $C_{16}H_{23}N_2OCl$ (percent): N, 9.51; C, 65.19; H, 7.87. Found (percent): N, 9.41; C, 64.55; H, 8.00.

What is claimed is:
1. A compound selected from the group consisting of compounds of the formula:

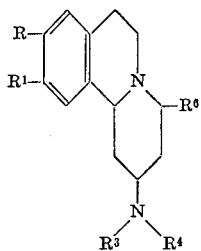

in which R is a member selected from the group consisting of H, OH and lower alkoxy, $R^1$ is a member selected from the group consisting of H, OH and lower alkoxy, $R^3$ is a member selected from the group consisting of H, (lower) alkyl, cycloalkyl of between 3 and 7 carbon atoms, phenyl, substituted phenyl, diphenyl, phenyl(lower)alkyl and substituted phenyl(lower)alkyl in which the substituents are homogeneous members selected from the group consisting of halogen, methyl, ethyl [(lower)alkyl], methoxy, ethoxy, mono cyano, methoxy or ethoxy carbonyl and m or p nitro, $R^4$ is a member selected from the group consisting of

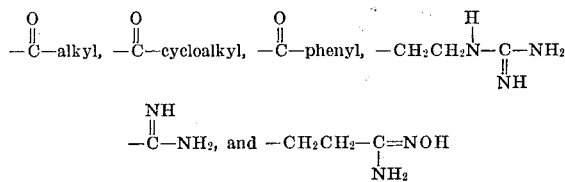

and $R^6$ is a member selected from the group consisting of H, (lower)alkyl and phenyl and pharmacologically acceptable mono salts of said compounds.

2. The compound of claim 1 which is N-[2-(1,3,4,6,7,11b-hexahydro-2H-benzo[a]quinolizinyl)]propionanilide.

3. The compound of claim 1 which is cis N-[2-(1,3,4,6,7,11b - hexahydro - 2H-benzo[a]quinolizinyl)]propionanilide.

4. The compound of claim 1 which is trans N-[2-(1,3,4,6,7,11b - hexahydro - 2H - benzo[a]quinolizinyl)]propionanilide.

5. The compound of claim 1 which is N-phenyl-N-(1,3,4,6,7,11b - hexahydro - 2H - benzo[a]quinilizine-2-yl)butyramide.

6. The compound of claim 1 which is N-phenyl-N-(1,3,4,6,7,11b - hexahydro - 2H - benzo[a]quinolizine-2-yl)acetamide.

7. The compound of claim 1 which is N-phenyl-N-(1,3,4,6,7,11b - hexahdyro - 9,10 - dimethoxy-2H-benzo[a]quinolizine-2-yl)propionamide.

8. The compound of claim 1 which is N-phenyl-N-(1,3,4,6,7,11b - hexahydro - 2H - benzo[a]quinolizine-2-yl)cyclopropane carboxamide.

9. The compound of claim 1 which is N-phenyl-N-(1,3,4,6,7,11b - hexahydro - 2H - benzo[a]quinolizine-2-yl)benzoamide.

10. The compound of claim 1 which is N-cyclohexyl-N-(1,3,4,6,7,11b - hexahydro - 2H - benzo[a]quinolizine-2-yl)propionamide.

11. The compound of claim 1 which is N-benzyl-N-(1,3,4,6,7,11b - hexahydro - 2H-benzo[a]quinolizine-2-yl)propionamide.

12. The compound of claim 1 which is N-phenethyl-N-[2-(1,3,4,6,7,11b - hexahydro - 2H - benzo[a]quinolizine-2-yl)]propionamide.

13. The compound of claim 1 which is N-(3-methylphenyl) - N - (1,3,4,6,7,11b - hexahydro-2H-benzo[a]quinolizine-2-yl)propionamide.

14. The compound of claim 1 which is N-(1,3,4,6,7,11b - hexahydro - 2H - benzo[a]quinolizine-2-yl)-2',4'-dimethoxypropionanilide.

15. The compound of claim 1 which is N-(1,3,4,6,7,11b - hexahydro - 2H - benzo[a]quinolizine-2-yl)-3',4',5'-trimethoxypropionanilide.

16. The compound of claim 1 which is N-(4-cyanophenyl) - N - (1,3,4,6,7,11b - hexahydro-2H-benzo[a]quinolizine-2-yl)propionamide.

17. The compound of claim 1 which is N-(4-biphenyl)-N - (1,3,4,6,7,11b - hexahydro-2Hbenzo[a]quinolizine-2-yl)propionamide.

18. The compound of claim 1 which is N - (1,3,4,6,7,11b - hexahydro - 2H-benzo[a]quinolizine-2-yl)propionamide.

References Cited

UNITED STATES PATENTS 3,055,883   9/1962   Mull _____ 260—287
3,420,847   1/1969   Bell _____ 260—288

DONALD G. DAUS, Primary Examiner

U.S. Cl. X.R.

260—283 CN, 286 R, 288 R, 289 R, 999